O. B. THOMPSON.
VEHICLE AXLE-NUT.
No. 192,031.                        Patented June 12, 1877.
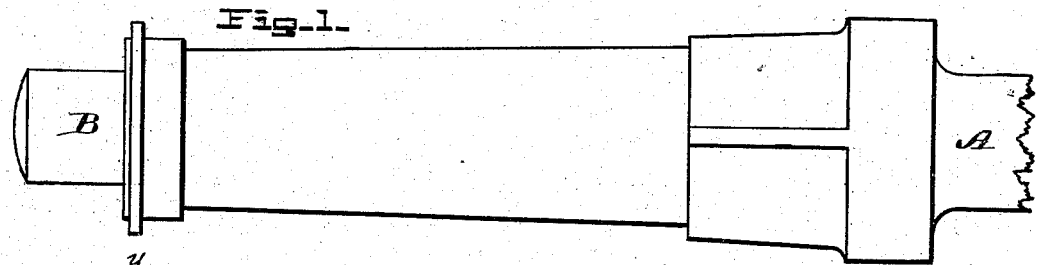
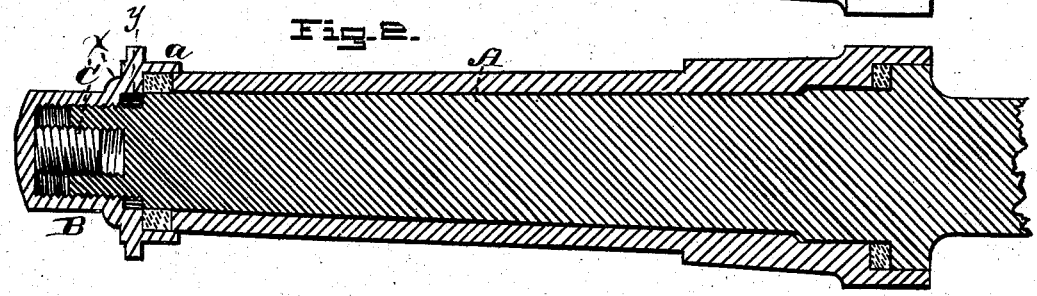
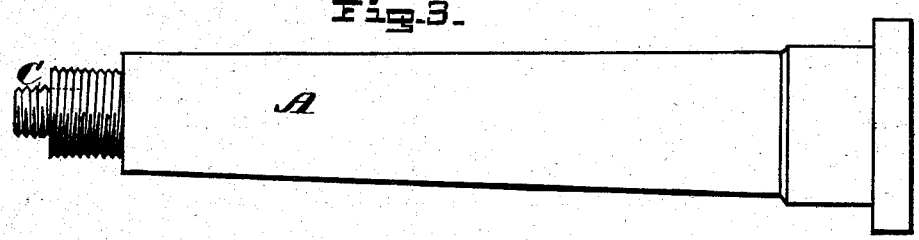
WITNESSES:
Jas. F. Duhamel
H. B. Brown
INVENTOR:
O. B. Thompson.
PER
H. T. Abbot.
ATTORNEY.

UNITED STATES PATENT OFFICE.

ORRIN B. THOMPSON, OF JERSEY, OHIO.

IMPROVEMENT IN VEHICLE-AXLE NUTS.

Specification forming part of Letters Patent No. 192,031, dated June 12, 1877; application filed November 27, 1876.

*To all whom it may concern:*

Be it known that I, O. B. THOMPSON, of Jersey, in the county of Licking and State of Ohio, have invented certain new and useful Improvements in Adjustable Axle-Nuts; and I do hereby declare that the following is a full, clear, and exact description thereof, which will enable others skilled in the art to which it appertains to make and use the same, reference being had to the accompanying drawings, and to letters of reference marked thereon, which form a part of this specification.

Figure 1 is an elevation of the axle-journal. Fig. 2 is a longitudinal section of same, showing the adjusting-screw in the end of the spindle. Fig. 3 is an elevation of the spindle and screw therein.

This invention consists in the construction, combination, and arrangement of a spindle with a screw in the end, and a nut covering and protecting the screw, while it takes up the loss from the wear of the washer, as will be hereinafter more fully described and set forth in claim.

In the end of the spindle, lettered A, on which the usual nut B is screwed, I make a screw-threaded socket, into which is inserted a screw, C. By inserting this screw, more or less, in the spindle, so as to diminish or increase its extent of projection beyond the end of the spindle, the point to which the nut may be screwed up on the spindle is regulated or varied; and this projecting of the screw, and the point to which the nut may be screwed, is determined by the thickness of the washer contained in the countersunk portion $a$ of the nut. Hence, as the washer wears away, and its thickness is diminished, the nut may be tightened or screwed up, so as to prevent rattling, by adjusting the screw C to the extent requisite.

The nut B has a recess, $y$, formed for the reception of the spindle A upon the tightening of the nut, to take up the wear of the washer. On the outside of the nut a fillet, $x$, is formed to strengthen the nut when the recess $y$ would otherwise weaken it.

The thread of the screw should be left-handed, and that of the nut right-handed, or vice versa, in order that the one may not be turned in adjusting the other—a provision the necessity for which is obvious.

What I claim is—

The combination of the adjustable nut B, having the recess $y$, with an axle having a screw, C, in the end of the spindle, substantially as shown and described, all constructed, arranged, and operating so that the nut shall inclose the screw C.

In testimony that I claim the foregoing as my own I affix my signature in the presence of two witnesses.

ORRIN BARNES THOMPSON.

Witnesses:
ELIZA CLARKE,
JOHN D. CLARKE.